March 3, 1931.  L. REICHERT ET AL  1,794,796
TAIL WHEEL MOUNT FOR AEROPLANES
Filed Nov. 12, 1929  2 Sheets-Sheet 1

INVENTORS
Michael Watter and
BY Ludwig Reichert
Bartlett Eyre Scott & Keel
ATTORNEYS

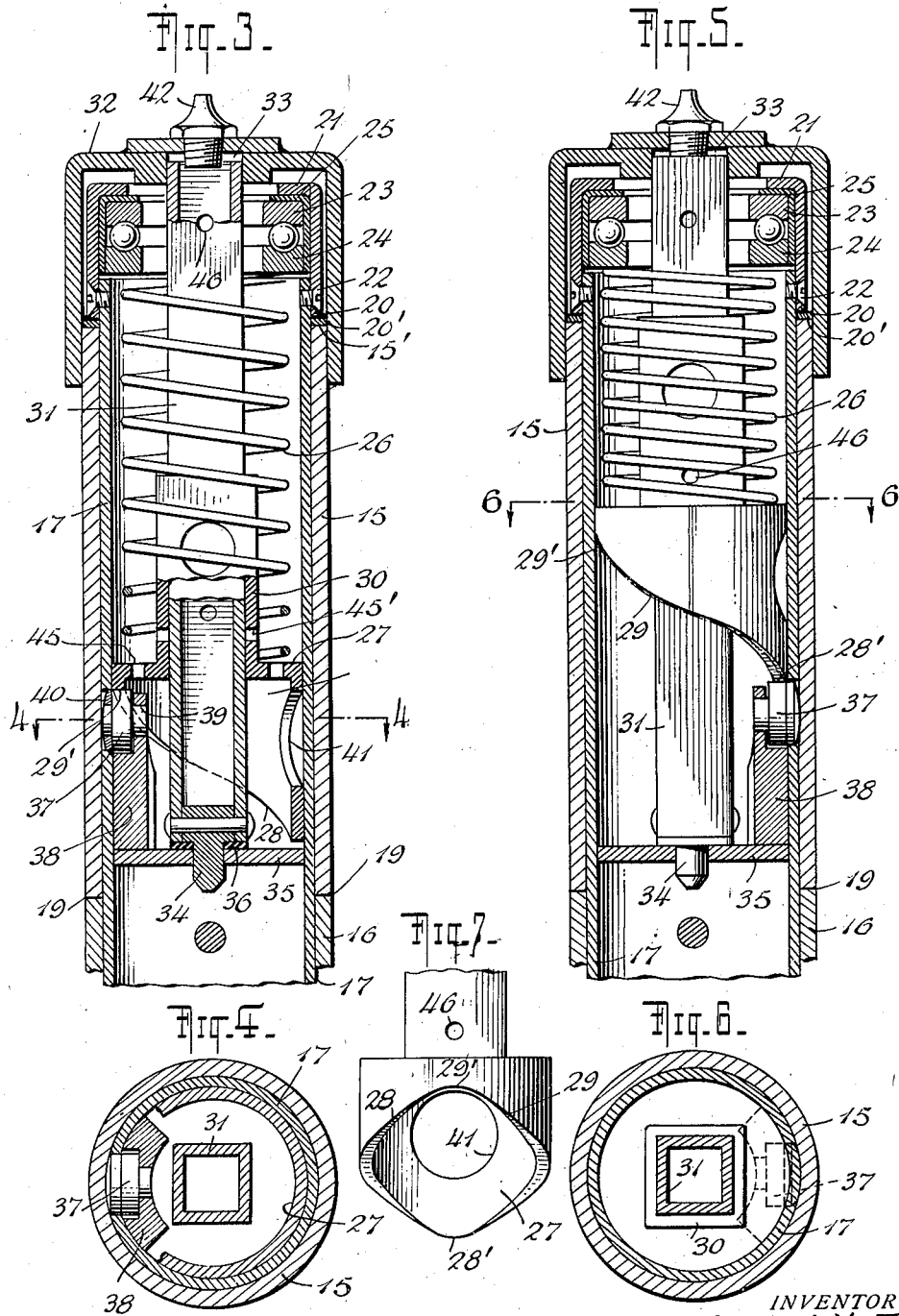

Patented Mar. 3, 1931

1,794,796

UNITED STATES PATENT OFFICE

LUDWIG REICHERT, OF BROOKLYN, AND MICHAEL WATTER, OF NEW YORK, N. Y., ASSIGNORS TO CHANCE VOUGHT CORPORATION, OF LONG ISLAND CITY, NEW YORK, A CORPORATION OF DELAWARE

TAIL-WHEEL MOUNT FOR AEROPLANES

Application filed November 12, 1929. Serial No. 406,586.

This invention relates to aeroplanes and particularly to tail landing gears for aeroplanes.

One object of the invention is a novel rear landing gear for aeroplanes including a wheel mount which permits the rotation or swivelling of the wheel and the automatic alignment thereof with any direction of movement of the craft while on the ground or shipboard but assures the automatic fore and aft alignment of the wheel while in the air. A further object of the invention is a mount of the above indicated character which is characterized by its simplicity in construction, its compactness and lightness in weight, its reliability and durability in service and the economy of its manufacture.

For a better understanding of the invention reference may be had to the accompanying drawings wherein:

Fig. 3 is a sectional view through a part of the wheel mount, Fig. 4 is a sectional view along the lines 4—4 of Fig. 3, Fig. 5 is a sectional view similar to Fig. 3 showing another operative position, Fig. 6 is a sectional view along the lines 6—6 of Fig. 5, and Fig. 7 is a view of the cam member.

Figure 1:
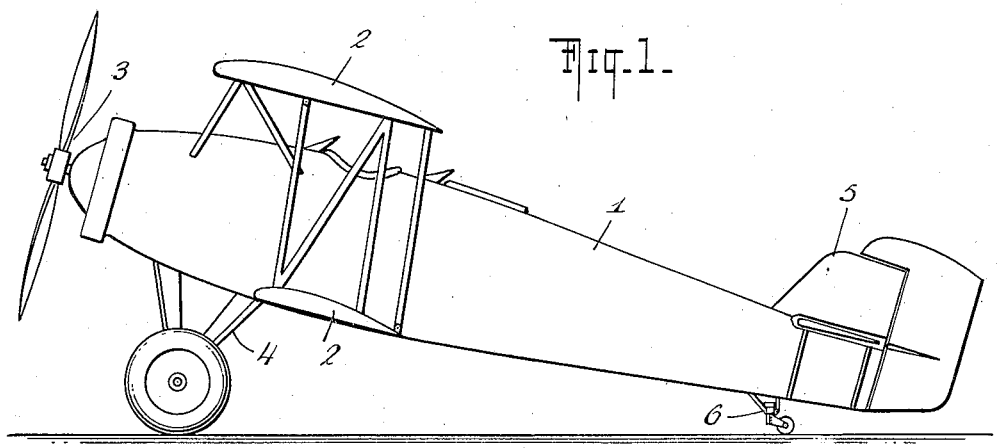
Fig. 1 is a side view of an aeroplane embodying the invention.

Referring to the drawings, the invention is illustrated as embodied in an aeroplane having a fuselage 1, biplane wings 2, a power plant and propeller 3, a forward landing gear 4 and a tail control 5. The rear or tail landing gear is indicated at 6 and in the particular embodiment shown includes a wheel or caster 7. Two of the fuselage frame members as, for example, upper and lower longerons are indicated at 8 and 9, and the tail wheel mount includes inclined members or struts 10 pivotally connected to suitable fittings 10' at the bottom of the fuselage and a yielding strut 11 as, for example, of the spring yielding type which is pivotally connected at a point or fitting 12 disposed within the fuselage 1 while the lower end of the strut 11 is pivotally connected at 13 to a lug 14 which is welded or otherwise secured to or formed as a part of the socket member 15 which carries the wheel 7 and its support 16. The struts or members 10 are fastened at their lower end as, for example, by welding to the member 15 and the arrangement is such as to permit the whole wheel mount to pivot about the points 10' with the strut 11 and wheel 7 moving in a vertical plane with no side movement, the yielding strut 11 permitting this upward movement of the wheel. The member 15 is in the form of a tubular socket for the reception of a tubular shank 17 carried within or otherwise fastened to the wheel support 16, the wheel 7 being carried from the support by means of a pair of bearing brackets 18, the latter being rigidly secured as, for example, by riveting to the members 16 and 17. The brackets 18 are inclined to the axis of the socket member 15, so that the wheel 7 is offset from that axis. The weight of the rear end of the craft is transmitted through the member 15 to the member 16 by means of co-operating annular bearing surfaces 19 provided on these two members for taking the load. The tubular shank 17 is adapted to rotate or swivel in either direction within the tubular member 15 and is provided at its upper end with an annular shoulder or bearing surface 20 which engages the upper end 15' of the tubular member 15 as a bearing surface for retaining the wheel and its shank within the casing 15 when the wheel is not in contact with the ground or floor. In the particular embodiment shown this shoulder 20 forms a lower edge of a closing cap 21, the latter telescoping the upper end of the shank 17 and being secured thereto by the screw bolts 22. An annular bearing ring 20' may be inserted between the shoulder 20 and the upper end of the casing 15. The cap 21 houses a ball bearing unit including upper and lower bearing rings 23 and 24 with the balls disposed therebetween and the retaining ring 25, the latter being flanged to conform to the interior of the cap 21. A spring 26 is housed within the tubular shank 17 with its upper end in engagement with the lower bearing ring 24 and with its lower end engaging a cam member 27, the latter including a lower cylindrical part for fitting within the tubular shank 17 and this cylindrical part being formed on its lower edge with a continuous cam surface composed of two oppositely disposed downwardly inclined branches 28, 29 which are joined at two points 28' and 29' disposed on opposite sides of the cylindrical member or 180° apart. The cam member 27 and the tubular shank 17 are relatively rotatable and are also relatively reciprocable, the member 27 including an upwardly extending guide sleeve or member 30 for reciprocating movements along a guide member 31, means being provided for preventing relative rotation of the members 30 and 31. In the particular embodiment shown this means consists in forming the members 30 and 31 of rectangular shape. The member 31 is supported at its upper end by means of a cap 32 which is rigidly fastened to the member 15, the upper end of the member 31 being indicated as disposed in an opening 33 formed in the cap 32. The lower end of the member 31 is provided with a bearing member 34 which passes through and is journalled in a disc member 35 rigidly carried within the tubular shank 17, the members 31 and 35 thereby being capable of relative rotation, and a bearing ring 36 is disposed between the journal member 35 and the lower end of the member 31 to minimize friction. The tubular shank 17 carries a roller 37 which engages the cam 28, 29. This roller is carried by a bracket 38 which extends upwardly from the disc 35 and is provided with an outer cylindrical surface fitting the interior of the tubular shank. Bracket 38 is recessed in line with the cam to accommodate the roller 37 and is provided with a journal 39 for supporting one side of the roller. The other side of the roller is provided with a journal member 40 of circular form which is disposed within a correspondingly formed opening in the tubular shank 17. The cam member 27 is formed on one side with an opening 41 for lightening the structure and the guide member 31 is also made hollow for the same purpose. The cap 32 is provided with a closing plug 42 in line with the hollow member 31 for the admission of a suitable lubricant which is distributed to the surfaces through the openings indicated.

Figure 2:
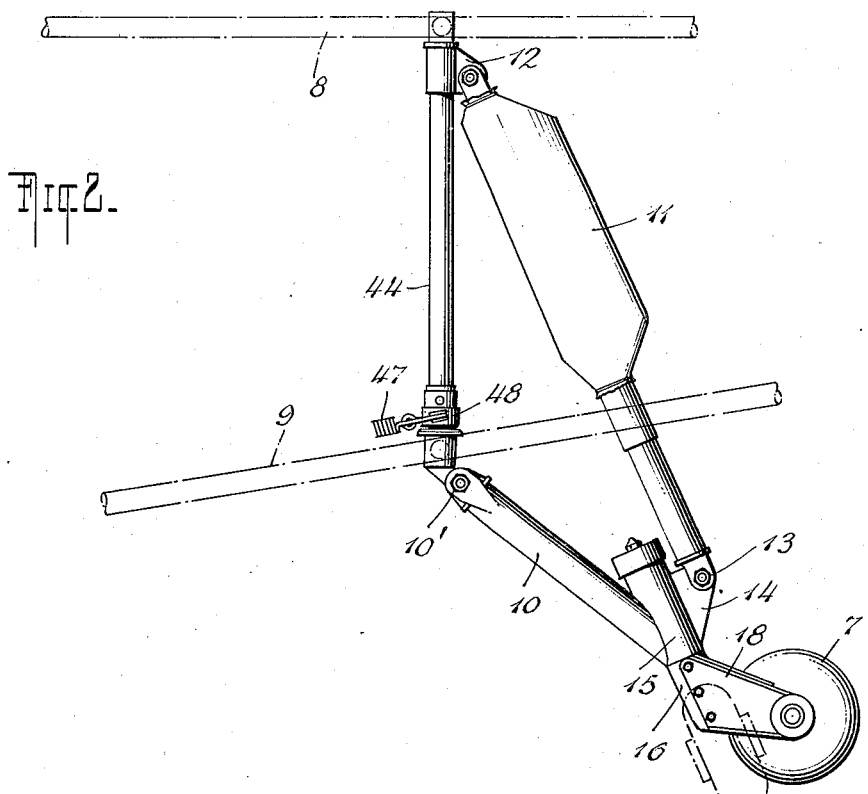
Fig. 2 is a side view on an enlarged scale of the tail wheel mount while in the air.

The operation of the tail wheel landing gear above set forth is as follows:

The wheel with its tubular shank 17 may be rotated in either direction within the tubular casing 15 but only against the force of the spring 26. For example, if it is rotated in one direction the roller 37 engages the cam 28 to reciprocate the member 27 against the force of the compression spring 26 while if it is rotated in the other direction the roller engages the opposite cam 29 which causes the same reciprocation of the member 27 against the tension of the spring. The wheel mount may, therefore, be readily rotated for shifting the craft about on the ground or floor space, the wheel 7 automatically aligning itself with the direction of movement, sidewise or otherwise. Immediately, however, the weight of the craft is lifted from the wheel the spring 26 through the medium of the cam and the roller 37 causes the wheel to assume a fore and aft position for minimizing air resistance and to place wheel in kept position to take the shock of landing as indicated in Fig. 2. Fig. 3 corresponds to the aligned position with the roller 37 in engagement with the highest point 29' of the continuous cam 28, 29, while Fig. 5 corresponds to the highest operative position of the cam member 27 relatively to the tubular shank 17 with the roller 37 in engagement with the lowermost point 28' of the continuous cam 28, 29 from which position the roller 37 will follow one or the other of the two branches 28, 29 of the cam immediately the weight is lifted from the wheel to return the wheel to the position corresponding to that of Fig. 3. The ball bearing unit permits the tubular shank 17 to rotate freely relatively to the spring without subjecting the upper end of the spring to torsion.

In the particular embodiment shown in the drawings the whole assembly unit including the struts 10 and 11 may oscillate laterally about the axis of the strut 44 which may, for example, be disposed in the center of the fuselage and which takes the vertical or upward component of load on strut 10. Springs 47 are indicated as connected with the strut 44 on opposite sides thereof by means of levers 48 which springs act as shock absorbers to restrain the rotation or oscillation of the assembly unit about the axis of the strut 44 and, if desired, limit cables may be added to arrest this lateral oscillatory movement and prevent the strut 11 from striking or fouling the lower longerons or other part of the craft.

We claim:

1. In a lading gear for aircraft a landing wheel and a mount therefor including means permitting the swiveling of the wheel approximately 360° and effecting alignment of the wheel with any direction of movement of the craft while on the ground and a spring motor means for effecting automatic fore and aft alignment of the wheel when the latter is lifted from the ground or floor.

2. A landing gear of the character set forth in claim 1 wherein the spring motor means includes a spring, a cam and an actuating member engaged by the cam for actuating the wheel to a fixed position regardless of the direction in which it has been swivelled.

3. In a landing gear for aircraft a wheel support member, a socket member in which said wheel support member is journalled for swiveling and aligning movements of the wheel support member, a spring cam device carried by one of said members, an actuating roller for engaging the cam and carried by the other of said members whereby upon the swiveling of the wheel support member said cam is operated against the tension of the spring, said cam being of a form to cause the roller to assume a fixed relative position when resistance to the spring and cam is removed.

4. A landing gear of the character set forth in claim 3 including a ball bearing unit disposed between the spring and one of the relatively rotatable members for preventing torsional strain on the spring.

5. In a landing gear for aircraft a wheel support, a socket in which said support is journalled for swiveling movements of the wheel, the axis of the socket being offset from the wheel axis, a reciprocable cam member carried by the socket, a spring for opposing the movements of the cam in one direction, an actuating roller carried by the wheel support and adapted to engage and actuate said cam when the wheel support is rotated in either direction and including means whereby the cam and the roller are caused to assume one fixed relative position when resistance is removed from the wheel.

6. In a landing gear of the character set forth in claim 5 wherein one end of the spring bears against the wheel support member with a frictionless bearing means interposed between the spring and the socket member.

7. In a landing gear of the character set forth in claim 5 wherein the cam member is formed from a cylinder with the cam surfaces being disposed generally in a plane forming an angle of less than 90° with the axis of the cylinder.

8. A landing wheel mount for aircraft including a tubular socket member, a tubular wheel shank member disposed in said socket, a spring, a cam carried by one of said members which is movable in one direction against the tension of the spring and actuating means carried by the other member and engaging said cam.

9. A landing wheel mount for aircraft including a tubular socket member, a tubular wheel shank member disposed in said socket, a spring, a cam carried by one of said members which is movable in one direction against the tension of the spring and actuating means carried by the other member and engaging said cam, said cam including two oppositely disposed downwardly inclined branches joined at one end to form a stable position for the actuating means and at the other end to form an unstable position therefor.

10. A tail wheel mount for aeroplanes including a relatively fixed tubular socket, a wheel shank journalled in said socket and having an annular bearing surface engaging the lower end of the tubular socket, a guide member depending from a relatively stationary part of the mount down into the tubular shank with the lower end thereof journalled in a bearing carried by the tubular shank, a cam member having a cylindrical bearing surface disposed within the tubular shank and reciprocable upon the dependant guide member, a roller carried by the tubular shank and engaging the cam and a spring surrounding the guide member and engaging the upper side of the cam.

11. A tail wheel mount for aeroplanes including a relatively fixed tubular socket, a wheel shank journalled in said socket and having an annular bearing surface engaging the lower end of the tubular socket, a guide member depending from a relatively stationary part of the mount down into the tubular shank with the lower end thereof journalled in a bearing carried by the tubular shank, a cam member having a cylindrical bearing surface disposed within the tubular shank and reciprocable upon the dependant guide member, a roller carried by the tubular shank and engaging the cam and a spring surrounding the guide member and engaging the upper side of the cam and a ball bearing unit disposed between one end of the spring and the tubular shank.

12. A landing gear of the character set forth in claim 1 including shock absorbing means for the landing gear unit.

13. In a landing gear for aircraft a landing device and a mount therefor including means permitting the swiveling of the device approximately 360° and effecting alignment of the device with any direction of movement of the craft while on the ground and a spring motor means contained within the mount for effecting automatic fore and aft alignment of the device when the latter is lifted from the ground or floor.

14. A landing gear unit for aircraft mounted for oscillation about an upwardly extending axis and including a wheel which is swivelly mounted in the unit.

15. A landing gear of the character set forth in claim 14 including yielding means for centering the unit and restraining the oscillation, and additional means for causing the swivelled wheel to assume a fore and aft position when not in contact with the ground.

In testimony whereof, we have signed our names to this specification.

LUDWIG REICHERT.
MICHAEL WATTER.